United States Patent
Childers et al.

(10) Patent No.: US 10,921,529 B2
(45) Date of Patent: Feb. 16, 2021

(54) LONG PUSH PULL SLEEVE INDICATING ORIENTATION

(71) Applicant: US Conec, Ltd, Hickory, NC (US)

(72) Inventors: Darrell R. Childers, Hickory, NC (US); Craig M. Conrad, Hickory, NC (US); Jason Higley, Hickory, NC (US); Jillcha F. Wakjira, Hickory, NC (US); Myron W. Yount, Conover, NC (US); Michael E. Hughes, Hickory, NC (US)

(73) Assignee: USConec, Ltd, Hickory, NC (US)

( * ) Notice: Subject to any disclaimer, the term of this patent is extended or adjusted under 35 U.S.C. 154(b) by 0 days.

(21) Appl. No.: 15/810,353

(22) Filed: Nov. 13, 2017

(65) Prior Publication Data

US 2018/0136414 A1    May 17, 2018

Related U.S. Application Data

(60) Provisional application No. 62/421,355, filed on Nov. 13, 2016.

(51) Int. Cl.
    *G02B 6/38* (2006.01)

(52) U.S. Cl.
    CPC ......... *G02B 6/3874* (2013.01); *G02B 6/3831* (2013.01); *G02B 6/3885* (2013.01); *G02B 6/3893* (2013.01); *G02B 6/3897* (2013.01)

(58) Field of Classification Search
    None
    See application file for complete search history.

(56) References Cited

U.S. PATENT DOCUMENTS

| | | |
|---|---|---|
| D347,208 S | 5/1994 | Martin et al. |
| D351,587 S | 10/1994 | Puchammer |
| D424,016 S | 5/2000 | Gipson et al. |
| D424,525 S | 5/2000 | Katwala |
| 6,146,023 A * | 11/2000 | Weigel ............... G02B 6/3879 385/139 |
| D460,946 S | 7/2002 | Montena |
| 6,439,920 B1 | 8/2002 | Chen |
| D478,321 S | 8/2003 | Peng |
| D488,783 S | 4/2004 | Goto |
| D494,933 S | 8/2004 | Lu |
| D552,560 S | 10/2007 | Victor |
| D637,160 S | 5/2011 | Hu |
| 9,052,474 B2 * | 6/2015 | Jiang .................... G02B 6/3898 |
| 9,658,409 B2 | 5/2017 | Gniadek et al. |
| D823,255 S | 7/2018 | de Jong et al. |
| D834,531 S | 11/2018 | Maroney et al. |

(Continued)

OTHER PUBLICATIONS

Amazon.com, "Long push pull sleeve indicating Orientation." www.amazon.com/karono-multi-mode'Transceivers-compatible-Application. 2016.

*Primary Examiner* — Chad H Smith
(74) *Attorney, Agent, or Firm* — Michael L. Leetzow, P.A.; Shubhrangshu Sengupta (57) ABSTRACT

An outer housing on a fiber optic connector allows for easier grasping to insert and remove a fiber optic connector, and in particular, in high density applications. The outer housing extends beyond a rear end of an inner housing. The outer housing also includes a way for a technician to see if the fiber optic connectors are installed correctly from a variety of positions relative to the installation.

7 Claims, 9 Drawing Sheets

(56) References Cited

U.S. PATENT DOCUMENTS

| | | | | |
|---|---|---|---|---|
| 2012/0082416 A1* | 4/2012 | Katoh | ................ | G02B 6/3831 |
| | | | | 385/72 |
| 2012/0099822 A1* | 4/2012 | Kuffel | .................. | G02B 6/381 |
| | | | | 385/78 |
| 2012/0141074 A1* | 6/2012 | Sabo | .................. | G02B 6/3885 |
| | | | | 385/78 |
| 2014/0169727 A1* | 6/2014 | Veatch | ............... | G02B 6/3831 |
| | | | | 385/11 |
| 2015/0378113 A1* | 12/2015 | Good | ................ | G02B 6/3883 |
| | | | | 385/71 |
| 2017/0023746 A1* | 1/2017 | Good | ................ | G02B 6/3831 |
| 2017/0254961 A1* | 9/2017 | Kamada | ............ | G02B 6/3887 |
| 2018/0011258 A1* | 1/2018 | Takano | .............. | G02B 6/3825 |

* cited by examiner

LONG PUSH PULL SLEEVE INDICATING ORIENTATION

REFERENCE TO RELATED CASE

This application claims priority under 35 U.S.C. § 119 (e) to provisional application No. 62/421,355 filed on Nov. 13, 2016, contents of which are hereby incorporated by reference in their entirety.

BACKGROUND OF THE INVENTION

Field of the Invention

The present invention relates to fiber optic connectors that have an inner connector housing and an outer connector housing. In the MPO style of connectors, the inner connector housing is used to move latches in an adapter so that the fiber optic connector can be latched into the adapter. Thus, the technician should be using the inner connector housing to insert the fiber optic connector into the adapter. The outer connector housing is pulled to release the latches from the fiber optic connector, thereby allowing the fiber optic connector to be removed. In high density applications, it is difficult to reach the inner connector housing, so the technician may push on the fiber optic cable to insert the fiber optic connector instead. It may also be difficult to fully grasp the outer connector housing in those high density installations. Thus, a longer outer sleeve that is easier to grasp is needed.

The fiber optic connectors also have a polarity—meaning that the fiber optic connector needs to be inserted in certain way. Typically there is a marking on one side of the fiber optic connector. But that marking can only be seen from one side and it may be difficult to see at all in the higher density applications. Thus, a more visible marking on the fiber optic connector is needed.

SUMMARY OF THE INVENTION

The present invention is directed to a fiber optic connector having a fiber optic ferrule, the fiber optic connector that includes an inner housing for receiving a portion of the fiber optic ferrule therein, the outer housing having an exterior surface and an interior surface and extending between a front end and a rear end, a main opening extending between front and rear ends of the outer housing, the main opening at least partially defined by the interior surface and configured to receive at least a portion of the inner housing and fiber optic ferrule therein, a portion of the inner housing extending beyond the front end of the outer housing, and a least one identification opening extending between the exterior surface and the interior surface and in communication with the main opening adjacent the rear end thereof.

In some embodiments, the at least one identification opening extends through the top side and an adjacent side and into the main opening.

In some other embodiments, the at least one identification opening comprises two identification openings, a first identification opening extending through a top side and a first side and a second identification opening extending through the top side and a second side, the first side and second side disposed across the main opening from one another.

According to another aspect of the present invention, the invention is directed to an outer housing for a fiber optic connector, the fiber optic connector including an inner housing and a fiber optic ferrule, the outer housing includes a main body having an exterior surface and an interior surface, the main body extending between a front end and a rear end, a main opening extending through the main body between the front and rear ends, the main opening at least partially defined by the interior surface of the main body and configured to receive at least a portion of the inner housing and fiber optic ferrule therein and to allow a portion of the inner housing and ferrule to the extend beyond the front end, and at least one identification opening extending between the exterior surface and the interior surface and in communication with the main opening in the main body adjacent the rear end.

According to yet another aspect of the present invention, the invention is directed to a fiber optic connector having a fiber optic ferrule, the fiber optic connector that includes an inner housing for receiving a portion of the fiber optic ferrule therein, the outer housing having an exterior surface and an interior surface and extending between a front end and a rear end, a main opening extending between front and rear ends, the opening at least partially defined by the interior surface of the main body and configured to receive at least a portion of the inner housing and ferrule therein, a portion of the inner housing and ferrule extending beyond the front end of the outer housing and means for identifying an orientation of the fiber optic connector at the second end of the outer housing.

In some embodiments, the means for identifying is at least one identification opening.

In some embodiments, the means for identifying is at least one projection extending from the exterior surface radially outward away from the interior surface, the at least one projection extending across a portion of a top side and along a portion of a first side and adjacent to the rear end.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION

Reference will now be made in detail to the present preferred embodiment(s) of the invention, examples of which are illustrated in the accompanying drawings. Whenever possible, the same reference numerals will be used throughout the drawings to refer to the same or like parts.

Figure 1:
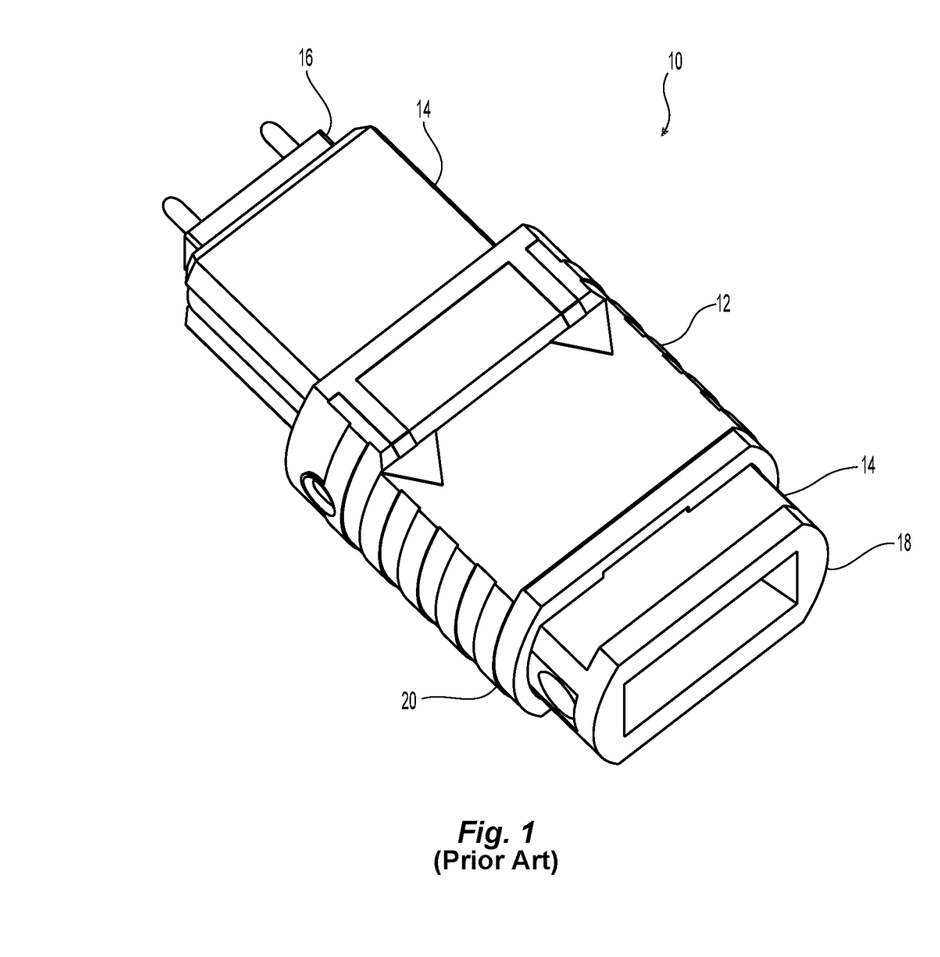
FIG. 1 is a perspective view of one portion of a prior art fiber optic connector.
Figure 2:
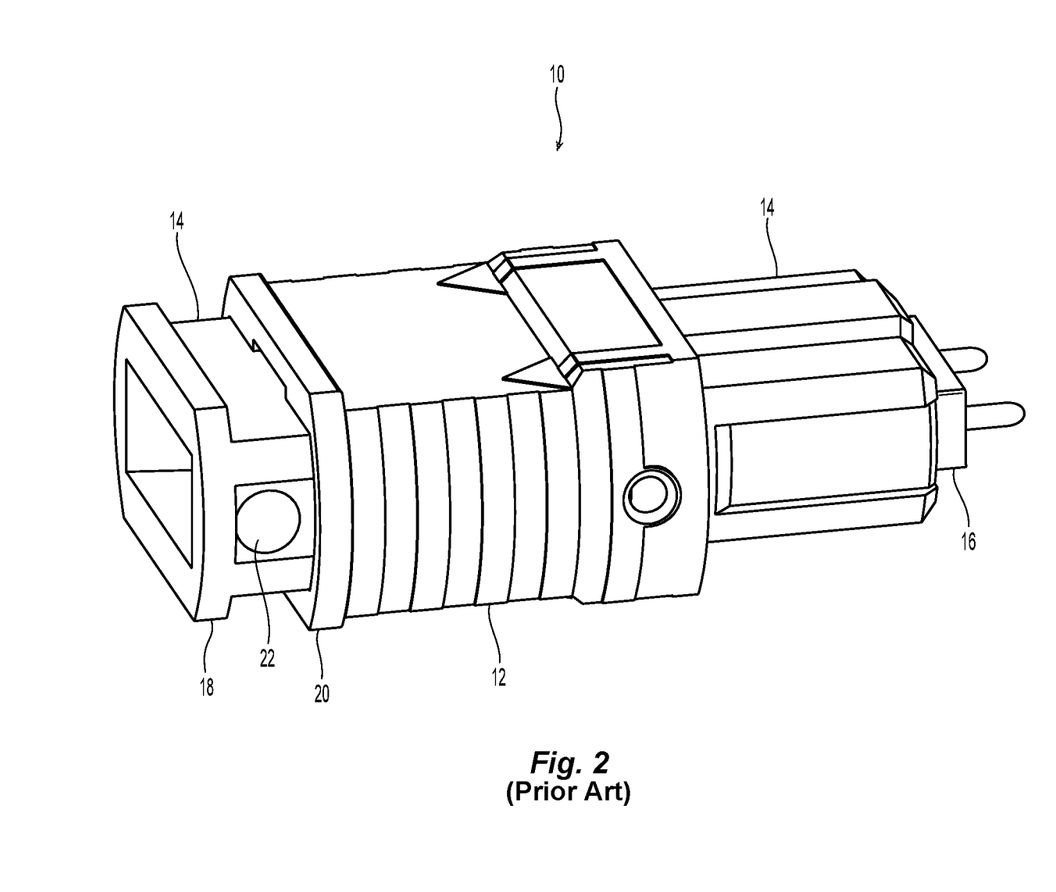
FIG. 2 is a right perspective view of a prior art fiber optic connector that illustrates the marking on a side thereof to indicate orientation.

FIGS. 1 and 2 illustrate a prior art version of a portion of a fiber optic connector 10 with a push-pull sleeve 12 (outer housing), an inner housing 14, and a fiber optic ferrule 16. The inner housing 14 is slidably disposed within the outer housing 12. The rear end 18 of the inner housing 14 extends beyond the rear end 20 of the outer housing 12. The amount of the inner housing 14 that is accessible for pushing the fiber optic connector 10 into an adapter being relatively small. Thus, the user may, rather than try to grab the small portion of inner housing that is accessible, just push on the strain relief boot (and/or the spring push or crimp band) to insert the fiber optic connector 10 into the adapter. The fiber optic connector 10 also has an indicia, such as a white dot 22, on one side to indicate the orientation of the fiber optic connector 10. See FIG. 2. However, the white dot 22 is only visible from one side and if there are additional fiber optic connectors 10 that are installed close to that side of the fiber optic connector 10, the white dot 22 may not be easily or clearly visible to the user. Further, adding the white dot 22 to the fiber optic connector 10 is an extra manufacturing step that adds to the overall labor costs of making the fiber optic connector 10.

Now referring to FIGS. 3-5 and 8, one embodiment of an outer housing 100 according to the present invention is illustrated. The outer housing 100 has a main body 102, an exterior surface 104, and an interior surface 106. The outer housing 100 extends between a front end 108 and a rear end 110.

Applicant notes that the term "front" or "forward" means that direction where the fiber optic connector would meet with another fiber-optic connector or device, while the term "rear" or "rearward" is used to mean the direction from which the optical fibers enter into the fiber-optic ferrule or fiber optic connector. Thus, "front" with respect to the outer housing illustrated in FIG. 3—as being where the end of the outer housing is at the top of the figure. The rear or rearward direction would be the opposite direction. For a fiber optic connector, front is the end where the optical fibers are terminated at a front face and the rear is where the optical fibers enter the fiber optic connector or fiber optic ferrule.

The outer housing 100 also includes a main opening 112 extending between front end 108 and rear end 110 of the outer housing 100. The main opening 112 is at least partially defined by the interior surface 106 of the main body 102 and is configured to receive at least a portion of an inner housing 114 (see FIGS. 4 & 5) and fiber optic ferrule 116. As is typical with these connectors, a portion of the inner housing 114 extends beyond the front end 108 of the outer housing 100. The outer housing 100 also has identification openings 118 extending between the exterior surface 104 and the interior surface 106 and is therefore in communication with the main opening 112 adjacent the rear end 110 thereof.

Figure 3:
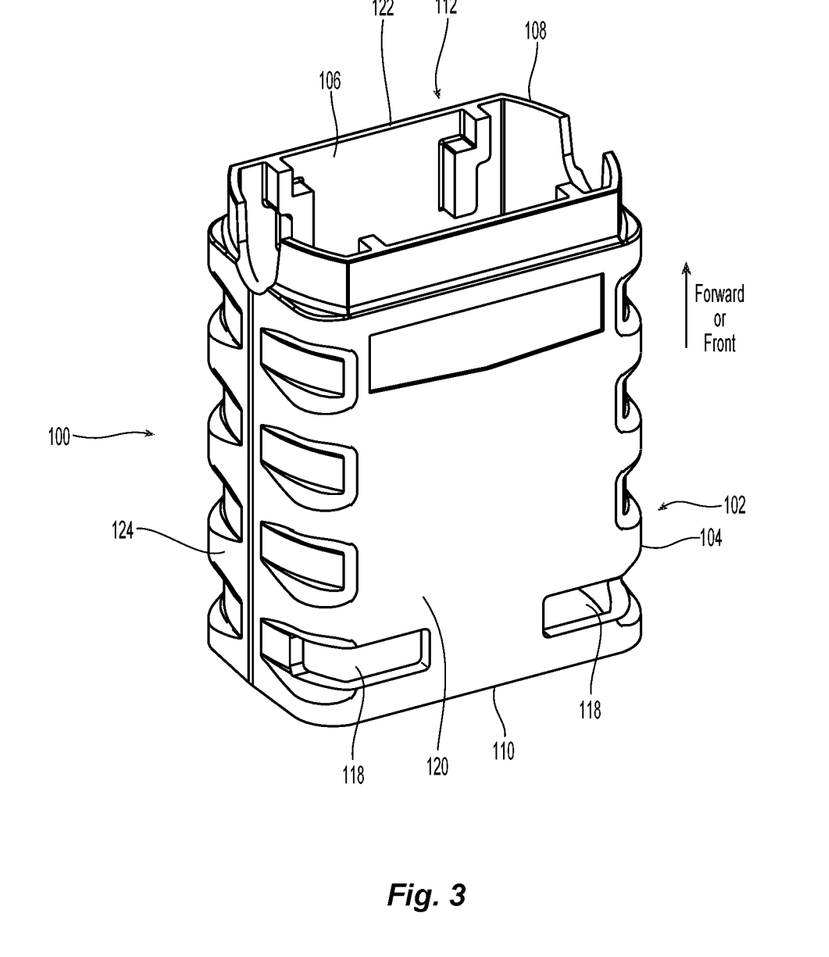
FIG. 3 is a perspective view of one embodiment of an outer housing according to the present invention.
Figure 4:
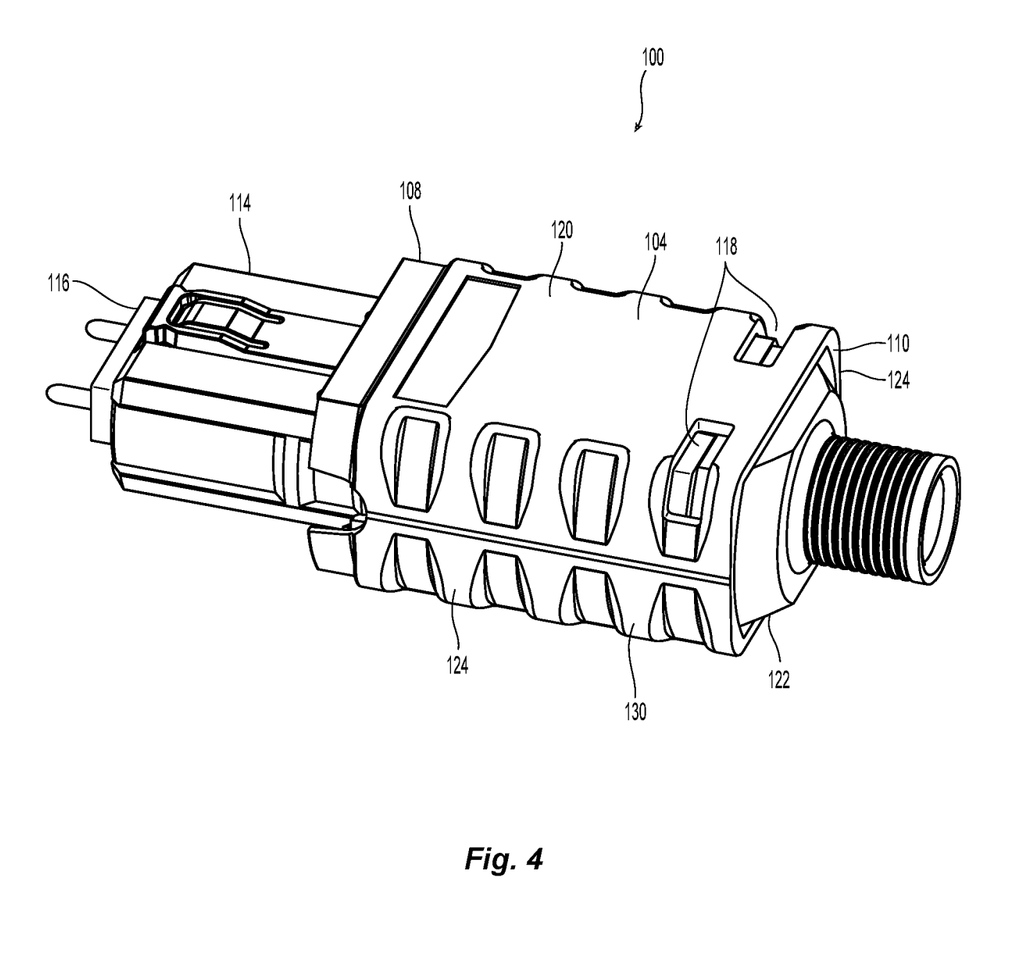
FIG. 4 is a left side perspective view of the outer housing in FIG. 3 installed on a fiber optic connector.
Figure 5:
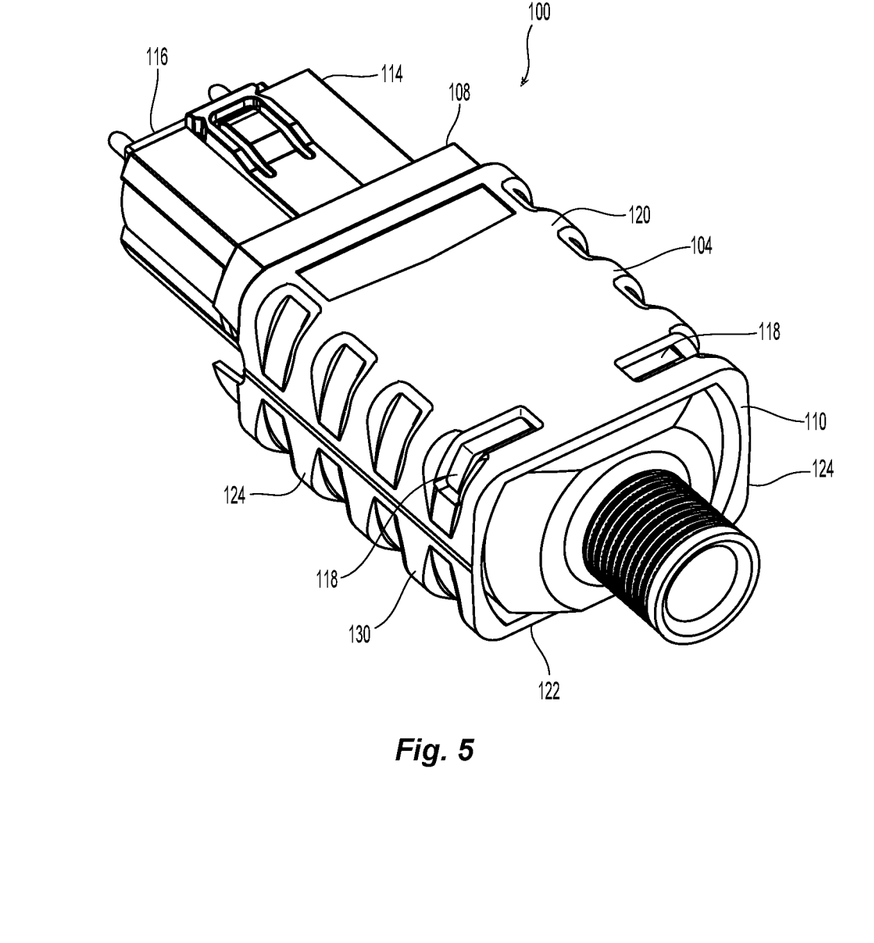
FIG. 5 is a left side perspective view of the outer housing in FIG. 3 installed on a fiber optic connector.

The identification openings 118 are illustrated in FIGS. 3-5 as slot-like openings in the outer housing 100, although the identification openings 118 could be other shapes as well. There are preferably two such identification openings 118 on opposite sides of the top side 120 of the outer housing 100. The identification openings 118 could also be on an opposite side, the bottom side 122 of the outer housing 100 (depending on the orientation of the outer housing 100). Each identification opening 118 also preferably continues around and down (or up if coming from the bottom side 122) a portion of each side 124 of the outer housing 100. The two sides 124 are on opposite sides of the main opening 112 and join the top side 120 with the bottom side 122. Alternatively, the identification openings 118 may only be on the top side or mostly on a side 124 and smaller opening in the top side 120.

Each of the identification openings 118 preferably extend completely through from the exterior surface 104 and through the interior surface 106, making the identification openings 118 in communication with the main opening 112. This configuration of the identification openings 118 allows even a casual observer to identify the orientation of the fiber optic connectors outfitted with the outer housing 100.

As can be seen in FIGS. 4 and 5, a rear end 130 of the inner housing 114 is visible through the identification openings 118. This means that the outer housing 100 (and the rear end 110) extends beyond the rear end 130 of the inner housing 114, unlike in the prior art connector 10 in FIGS. 1 and 2. For clarity, the rear end 130 of the inner housing 114 does not extend into the identification openings 118. The actual placement of the identification openings 118 may also be located closer to the front end 108. The identification openings 118 are disposed adjacent the rear end 110 of the outer housing 100. By "adjacent," Applicant means that the identification openings 118 are close to the end, but may be moved forward and still be adjacent, as long as there are no intervening structures that come between the rear end 110 and the identification openings 118. However, as noted above, the identification openings 118 cannot be moved too far forward as they will not be easily discerned by an observer.

Figure 6:
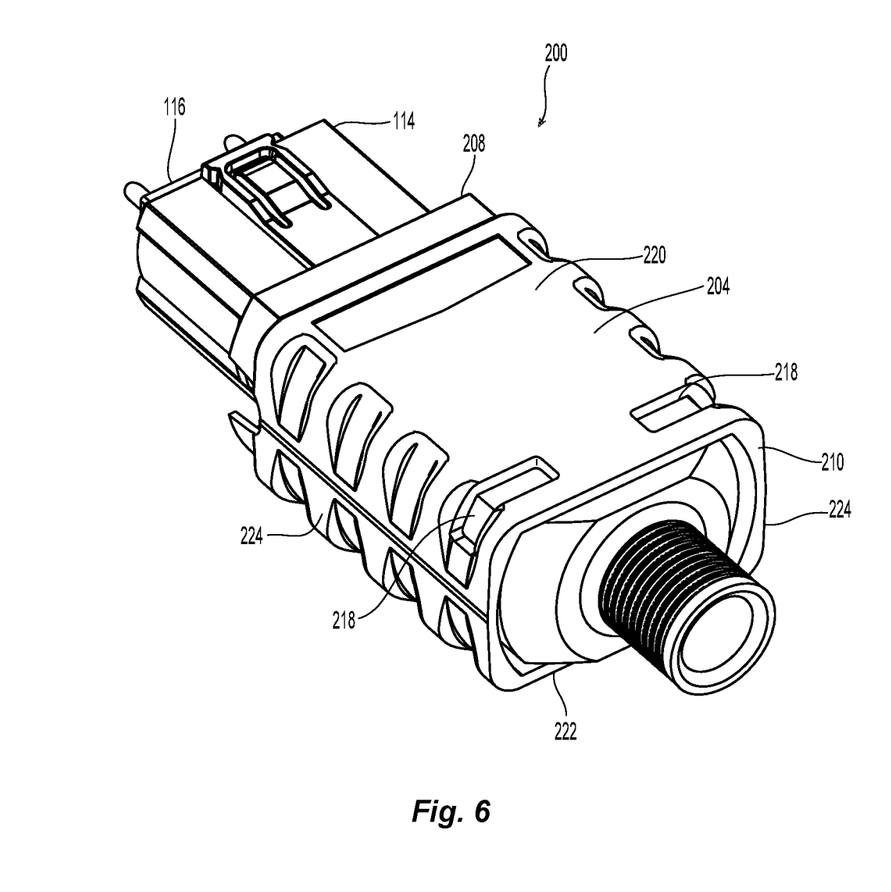
FIG. 6 is a perspective view of another embodiment of an outer housing according to the present invention.

An alternative embodiment of an outer housing 200 to be used with a fiber optic connector is illustrated in FIG. 6. The outer housing 200 has a main body 202, an exterior surface 204 and an interior surface (not visible but similar to interior surface 106). The outer housing 200 extends between a front end 208 and a rear end 210 also includes a main opening (not visible in FIG. 6) extending between front end 208 and rear end 210. The main opening is at least partially defined by the interior surface of the main body 202 and is configured to receive at least a portion of an inner housing 114 and fiber optic ferrule 116.

The outer connector housing 200 has a different configuration for the identification openings 218 in this embodiment. Rather than extending between the exterior surface 204 and the main opening, the identification openings 218 extend into the main body 202 from the exterior surface 204 but do not penetrate into the main opening by going through the interior surface. Thus, the rear end 130 of the inner housing 114 is not visible. But as with the prior embodiment, the outer housing 200 still extends beyond the rear end 130 of the inner housing 114. Again, the identification openings 218 could take on other configurations, lengths, widths, or even depths into the main body 202 as discussed above for the first embodiment.

Figure 7:
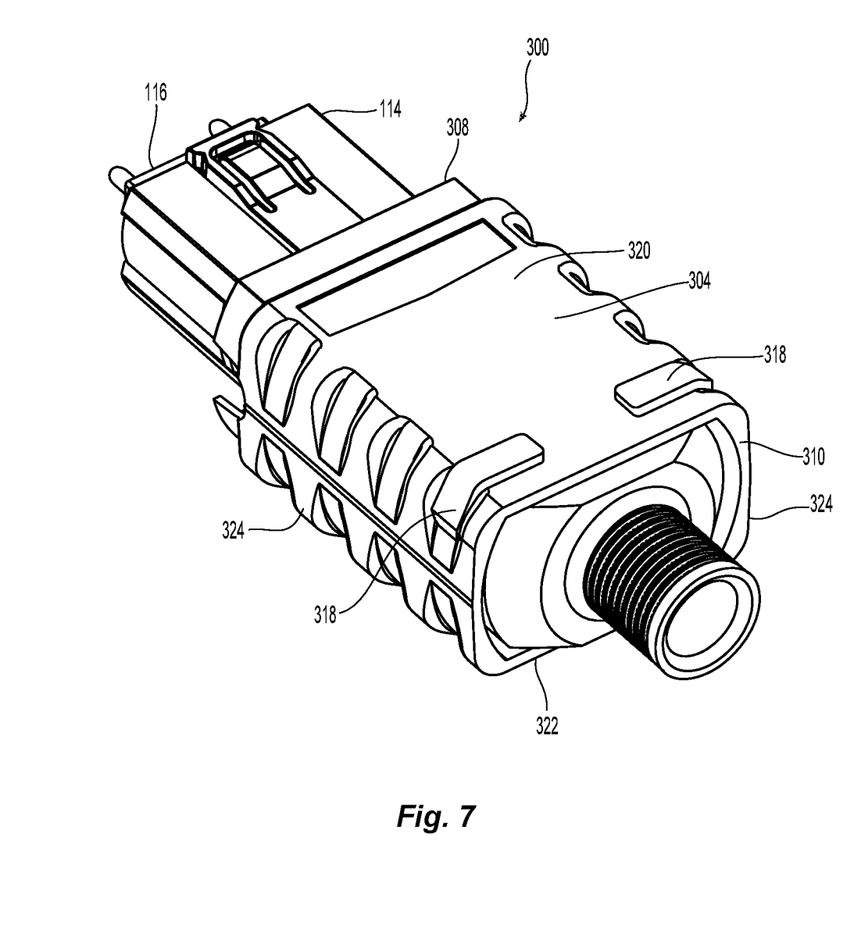
FIG. 7 is a perspective view of a third embodiment of an outer housing according to the present invention.
Figure 8:
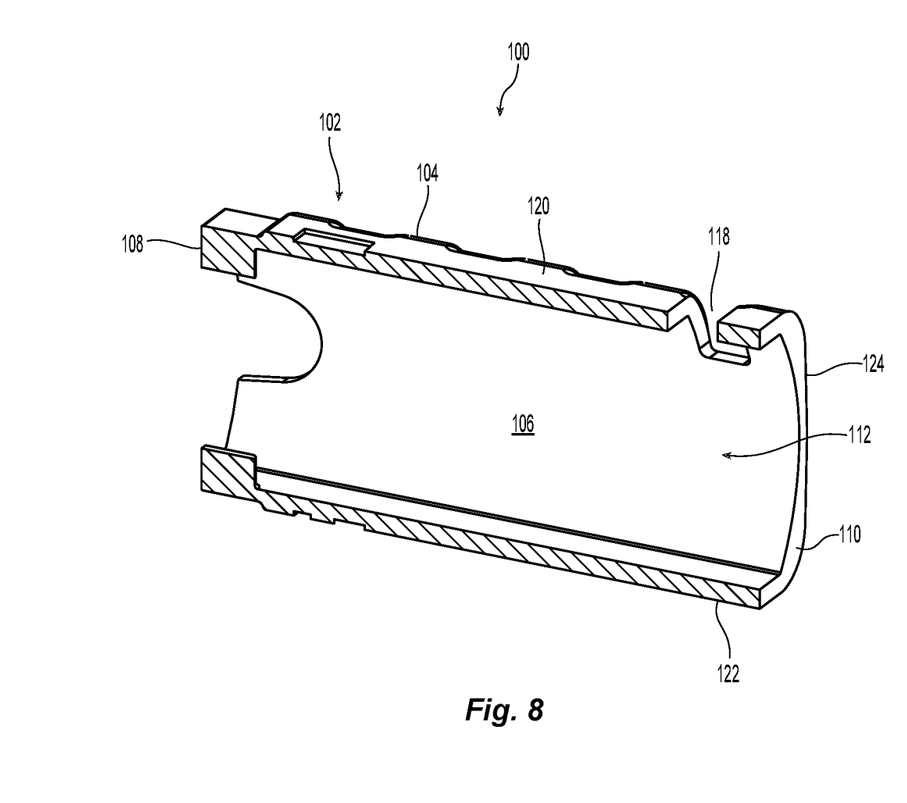
FIG. 8 is a cross section view of the outer housing of FIG. 3.

Yet another embodiment of an outer connector housing 300 that can be used with a fiber optic connector is illustrated in FIG. 7. The outer housing 300 has a main body 302, an exterior surface 304 and an interior surface (not visible but similar to interior surface 106). The outer housing 300 also extends between a front end 308 and a rear end 310 also includes a main opening (not visible in FIG. 7) extending between front end 308 and rear end 310. The main opening is at least partially defined by the interior surface of the main body 302 and is configured to receive at least a portion of an inner housing 114 and fiber optic ferrule 116.

Instead of having openings in this embodiment, the outer housing 300 has identification elements 318 that extend upward and outwardly (radially) from the exterior surface 304. These identification elements 318 preferably extend higher than other structures that are on the outer housing 300 so that they are easily visible to an observer. Because there is no opening in the top or sides of outer housing 300, the rear end 130 of the inner housing 114 is not visible. But as with the prior embodiment, the outer housing 300 still extends beyond the rear end 130 of the inner housing 114. Again, the identification elements 318 could take on other configurations, lengths, widths, or even heights from the main body 302.

Figure 9:
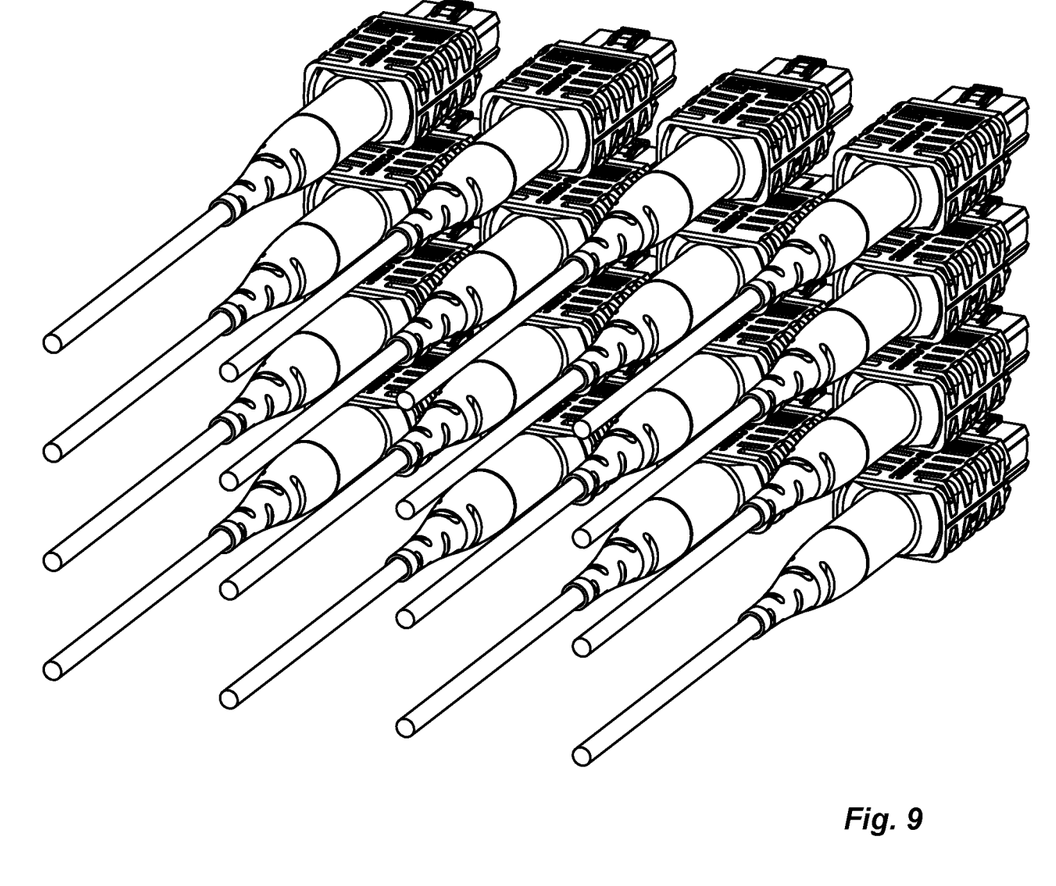
FIG. 9 is perspective view of a high density installation of fiber optic connectors with one of the embodiments of the outer housing according to the present invention.

Applicant notes that the identification openings 118, identification openings 218, and the identification elements 318 are the means referred to in the claims. Thus, the outer housings could use holes, a series of holes separated by bridges made from the same material as the outer housing, depressions (of varying depths) and even projections (again of varying heights) to make the orientation clear. In this manner, each of these elements is used to identify the orientation of the outer housings and fiber optic connectors that are installed in adapters and particularly in high density applications. See FIG. 9 where one of the fiber optic connectors has been installed upside down. The incorrectly oriented fiber optic connector in FIG. 9 can easily identified from different viewing angles using the aspects of the present invention. Additionally, the added lengths of the outer housings make it easier to grasp and insert the fiber optic connectors in those adapters and high density applications.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic connector having a fiber optic ferrule, the fiber optic connector comprising:
    an inner housing for receiving a portion of the fiber optic ferrule therein;
    an outer housing having an exterior surface and an interior surface and extending between a front end and a rear end;
    a main opening extending between front and rear ends of the outer housing, the main opening at least partially defined by the interior surface and configured to receive at least a portion of the inner housing and fiber optic ferrule therein, a front portion of the inner housing extending beyond and forward of the front end of the outer housing; and
    a first identification opening in a rear half of one of a top side and a bottom side of the outer housing and a second identification opening in a rear half of one of a first side and a second side wherein the first side and the second side join the top side and the bottom side, and wherein the first identification opening is in a portion of the outer housing that is closer to one of the first side and the second side.

2. The fiber optic connector according to claim 1, wherein the first and second identification openings extend through the outer housing and into the main opening.

3. The fiber optic connector according to claim 2, wherein the first and second identification openings extend through the top side and an adjacent side and into the main opening.

4. The fiber optic connector according to claim 1, wherein the first identification opening is disposed on the top side and the first side and the second identification opening is disposed on the top side and the second side.

5. The fiber optic connector according to claim 1, wherein at least a portion of the the first and second identification openings are disposed in the outer housing between the rear end thereof and a rear end of the inner housing.

6. The fiber optic connector according to claim 1, wherein the inner housing has a rear end, the rear end of the inner housing is disposed between the front and rear ends of the outer housing.

7. The fiber optic connector according to claim 4, wherein the two identification openings are spaced apart from one another across a top side of the outer housing, a portion of the outer housing separating the two identification openings, the portion having a predetermined width that is greater than a width of optical fibers extending rearwardly from the fiber optic connector.

* * * * *